(12) United States Patent
Downor

(10) Patent No.: US 10,642,261 B2
(45) Date of Patent: May 5, 2020

(54) HIGH NOTIFICATION RATE DETECTION

(71) Applicant: General Electric Company, Schenectady, NY (US)

(72) Inventor: Johnny Downor, Salem, VA (US)

(73) Assignee: General Electric Company, Schenectady, NY (US)

(*) Notice: Subject to any disclaimer, the term of this patent is extended or adjusted under 35 U.S.C. 154(b) by 411 days.

(21) Appl. No.: 15/535,295

(22) PCT Filed: Dec. 12, 2014

(86) PCT No.: PCT/US2014/069998
§ 371 (c)(1),
(2) Date: Jun. 12, 2017

(87) PCT Pub. No.: WO2016/093858
PCT Pub. Date: Jun. 16, 2016

(65) Prior Publication Data
US 2018/0239347 A1    Aug. 23, 2018

(51) Int. Cl.
*G05B 23/02* (2006.01)
*G05B 19/4063* (2006.01)

(52) U.S. Cl.
CPC ..... *G05B 23/0272* (2013.01); *G05B 19/4063* (2013.01); *G05B 2219/31337* (2013.01); *G05B 2219/31437* (2013.01); *G05B 2219/34491* (2013.01)

(58) Field of Classification Search
None
See application file for complete search history.

(56) References Cited

U.S. PATENT DOCUMENTS

| | | |
|---|---|---|
| 2004/0133294 A1 | 7/2004 | Chen et al. |
| 2009/0132589 A1 | 5/2009 | Daos et al. |
| 2009/0171481 A1 | 7/2009 | Chiang et al. |
| 2015/0067401 A1* | 3/2015 | Ichikawa ............ G06F 11/0766 714/37 |

OTHER PUBLICATIONS

International Search Report and Written Opinion issued in connection with corresponding PCT Application No. PCT/US2014/069998 dated Sep. 16, 2015.
International Preliminary Report on Patentability issued in connection with corresponding PCT Application No. PCT/US2014/069998 dated Jun. 13, 2017.

* cited by examiner

*Primary Examiner* — Roy Y Yi
(74) *Attorney, Agent, or Firm* — Armstrong Teasdale LLP

(57) ABSTRACT

Systems and related approaches for monitoring the notification rate of live alarms being presented to an operator in the presentation tool. The number of notifications being received is counted and managed as a rate due to the update frequency of the tool. In some embodiments, when the number of notifications received exceeds a threshold, an indicator is presented to the operator alerting them to the abnormality. The operator may then examine the system as necessary to locate the source of the abnormality.

12 Claims, 4 Drawing Sheets

| SYMBOL | RATE | DEVICE NAME | ACKNOWLEDGED? | ALARM STATE | VARIABLE NAME | | | | | |
|---|---|---|---|---|---|---|---|---|---|---|
| = | 0 | COMP. 1 | Y | OFF | VAR 1 | | | | | |
| + | I | COMP. 2 | N | ON | VAR 2 | | | | | |
| - | II | COMP. 3 | N | ON | VAR 3 | | | | | |

FIG. 4

HIGH NOTIFICATION RATE DETECTION

BACKGROUND OF THE INVENTION

Field of the Invention

The subject matter disclosed herein generally relates to the detection of high notification rates in a control system.

Brief Description of the Related Art

Industrial control (global) systems may create, consume, and identify alarms used to alert a user of a dangerous or abnormal condition. In some cases, alarms must propagate from one location in the control system to the user system. Notifications are the methods in which alarms propagate through the respective system. Through these notifications, alarms are sent to devices that are preconfigured to receive the alarm.

One tool commonly used in these industrial control systems is a presentation or visualization tool that provides a visual representation of components in the industrial control system. This presentation tool is typically running on a computing device under multiple instances to assist the operator in observing the behavior of any number of running processes. If an unexpected event occurs in the operation of the process, an alarm is generated which is then presented to the screen. The operator may then take appropriate action to correct the running process.

In some environments, multiple notifications may be generated for the same alarm. For example, based on the configuration of the industrial control system, the presentation tool may receive the same notification indicative of an alarm at a rate of 50 times per second. Present systems are unable to detect this high rate of notification receipt because this information is not visible to the operator. Similarly, in the context of alarms, if there is an issue with respect to how the alarm is being constructed, the notification rate may also become excessive.

In some cases, the operator may be able to use the presentation tool to select the alarm and elect to acknowledge that they have viewed the alarm, and solve the issue accordingly. However, in other cases, it may be difficult or impossible to acknowledge the alarm due to further issues with the notification failing to be provided to the presentation tool. As an example, incorrect hysteresis may be occurring at the control system or the alarm value may be in a dithering state in which the alarm repeatedly approaches the alarm triggering point.

The above-mentioned problems have resulted in some user dissatisfaction with previous approaches.

BRIEF DESCRIPTION OF THE INVENTION

The examples described herein provide systems and related approaches which monitor the notification rate of live alarms being presented to an operator in the presentation tool. The number of notifications being received is counted and managed as a rate due to the update frequency of the tool. In some embodiments, when the number of notifications received exceeds a threshold, an indicator is presented to the operator alerting them to the abnormality. The operator may then examine the system as necessary to locate the source of the abnormality. As such, the operator may quickly and efficiently discern whether particular components are generating high rates of alarms.

In many of these embodiments, approaches are provided where, over a given time period, notifications of an adverse condition are counted. These notifications are then compared to a predetermined threshold number of notifications. When the predetermined threshold number of notifications is exceeded, information is presented to a user or operator so they may address an operating issue at a control system associated with the notification. A timer associated with the given time period is then reset.

In some approaches, the notifications include information used to construct an alarm. The step of counting notifications may include detecting information used to construct an abnormal, non-alarm event In some aspects, it may be determined whether the notification exists in a database. If the notification does not exist in the database, the notification is then added thereto. A value associated with the counter may be increased by one unit upon the receipt of each notification.

In other approaches, activity of an industrial control system is detected. A notification may be received that is representative of an event that has abnormally occurred in a control system. It may then be determined whether the notification exists in a database, and if it does not, the notification is added to the list. A rate counter that is representative of the number of received notifications is then increased.

In still other examples, upon receiving the notifications and determining that the notification exists in the database, the notification may be retrieved from the list and a value representative of a rate or receipt of notifications is displayed. The rate counter is then reset.

In many of these embodiments, a rate detection apparatus is provided and includes an interface with an input and an output and a processor coupled to the interface. The processor is configured to over a given time period, count notifications via the input and compare the notifications that have been counted to a predetermined threshold number of notifications. The processor is further configured to present information to a user via the output to address an operating issue at a control system associated with the notification upon exceeding a threshold number of notifications.

In many approaches, the notifications correspond to information used to construct an alarm condition of the control system. Conversely, the notifications may correspond to information used to construct an abnormal operating condition of a sensor in the control system.

BRIEF DESCRIPTION OF THE DRAWINGS

For a more complete understanding of the disclosure, reference should be made to the following detailed description and accompanying drawings wherein:

FIG. 4 comprises an illustration of a presentation tool used for high notification rate detection according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE INVENTION

Approaches are provided that aid in the detection of a high rate of notifications. This is used as an indicator that additional troubleshooting is required. By "notification" and as used herein, it is meant the receipt or transmission of a message indicating something of interest relating to the process or system being monitored. For example, notifications may relate to alarms or process alarms which are running processes that an operator has the ability to control and/or events which are notifications that may be of interest to an operator at some point. Notifications may relate to holds, or set points required in systems where stabilization is required before continued operation, and/or diagnostics which are hardware oriented and may be generated upon failing to properly measure a value or reading in the system.

In one aspect, the rate of notifications is measured and presented to the presentation tool. The presentation tool may have any number of identifiers which may assist in drawing the user or operator to the measured rate. Accordingly, the user may address the alarm or the cause of the alarm accordingly, thus resulting in increased system efficiency and reduced system downtime.

The control system may include any number of components which generate sensory data. This sensory data may include temperatures, pressures, readings, and the like and may be digitized at an operator's site to be viewed at the presentation tool.

Based on the number of control or other systems being monitored, the user may observe any number of data and/or alarm indicators at a given time. By providing an indication of which notifications are occurring at a relatively higher rate, the user may attend to the source of these notifications before dealing with others.

Figure 1:
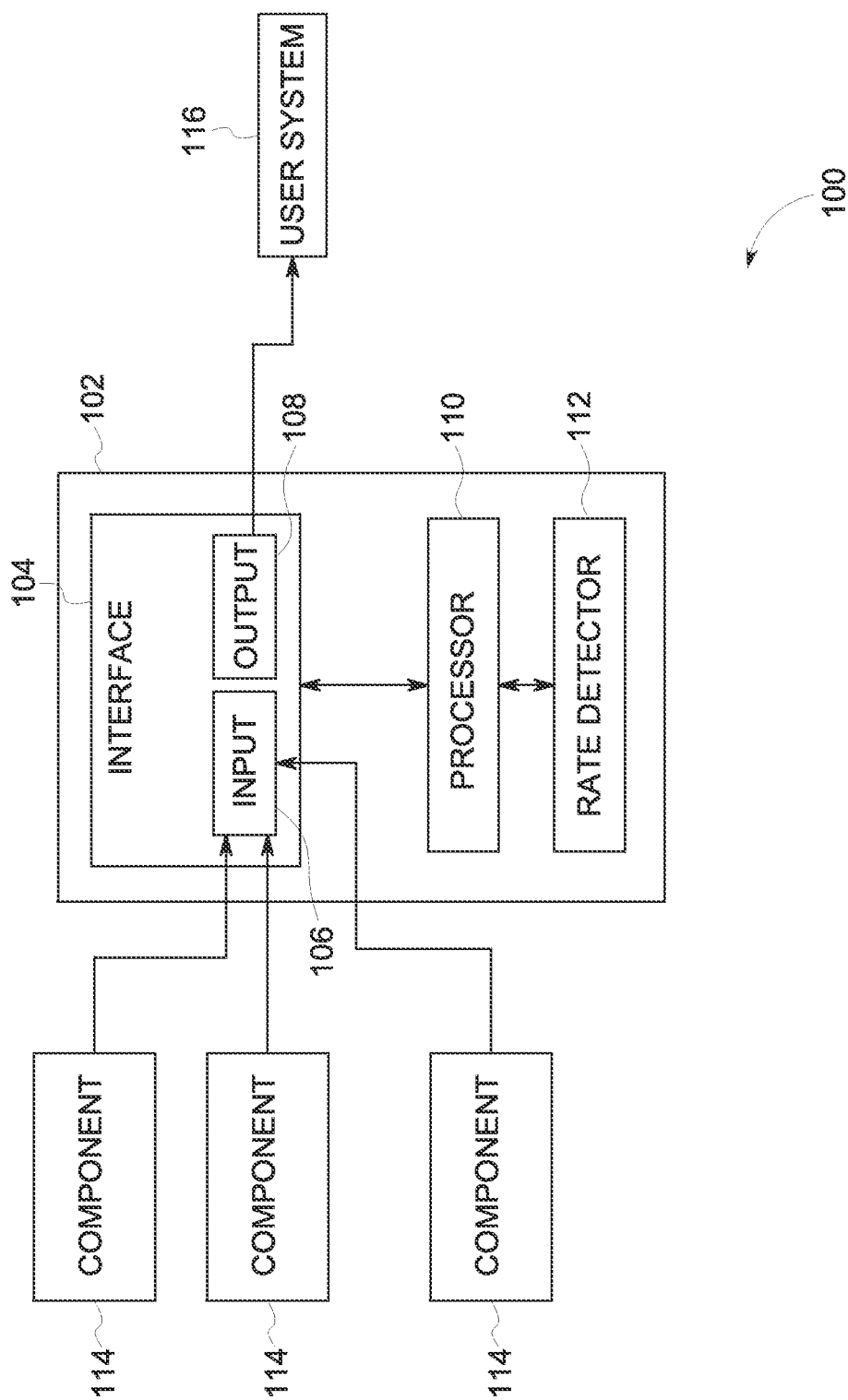
FIG. 1 comprises a block diagram illustrating an exemplary system for high notification rate detection according to various embodiments of the present invention.

Referring now to FIG. 1, one example of a system 100 for high notification rate detection is described. The system 100 includes an apparatus 102 which includes an interface 104 having an input 106 and an output 108, a processor 110, and a rate detector 112. The system 100 further includes any number of components 114 and the user system 116.

The apparatus 102, and particularly the processor 106, is any combination of hardware devices and/or software selectively chosen to generate, display, and/or transmit communications. The interface 104 is a computer based program and/or hardware configured to accept a command at the input 106 and transmit the generated communication at the output 108. Thus, the function of the interface 104 is to allow the apparatus 102 to communicate with the components 114, the user, the rate detector 112, and the analytic system.

The rate detector 112 may be any combination of hardware and/or software elements and is stored on any known system. In some examples, a portion of the rate detector 112 is stored on the apparatus 102, for example on a memory module contained therein. Alternatively, the rate detector may be stored directly on the processor 110. It is understood that in some forms the rate detector 112 is stored at the user system 116. The rate detector 112 is configured to measure and calculate the frequency of a notification representative of an alarm or other abnormal condition and transmit this information to the processor.

The components 114 may be any type of component capable of providing data to the input 106. The components 114 may industrial components such as pumps, turbines, motors, valves, or other industrial systems and related components and may include any number of sensors, gauges, and other components for measuring data.

The user system 116 may be any combination of hardware and/or software elements configured to execute a task. In some forms, the user system 116 may be a remote networking device accessible by the apparatus 102 and any number of additional computing devices. In other forms, the apparatus 102 is a component of the user system 116. In other examples, the user system 116 is cloud based, meaning groups of remote servers are networked to provide a centralized data storage access to services or resources.

The data structures utilized herein may utilize any type of programming construct or combination of constructs such as linked lists, tables, pointers, and arrays, to mention a few examples. Other examples are possible.

The processor 110 is a combination of hardware devices and/or software selectively chosen to monitor settings of the desired system. The processor 110 may be physically coupled to the interface 104 through a data connection (e.g., an Ethernet connection), or it may communicate with the interface 104 through any number of wireless communications protocols.

It will be appreciated that the various components described herein may be implemented using a general purpose processing device executing computer instructions stored in memory.

The interface 108 communicates with the user system 116 and transmits required data according to the calculations of the rate detector 112. This may be a variety of information pertaining to conditions of the components 114.

In operation, the component or components 114, over a given time period, transmit data and notifications that are received by the interface via the input 106. This given time period may vary, and may be, for example one second. The processor 110, coupled with the rate detector 112, is then configured to count notifications and compare the number of notifications that have been counted to a predetermined threshold number of notifications. It is understood that this threshold number of notifications may vary, but an exemplary threshold number may be 10 notifications over the given time period.

The processor 110 is further configured to present information to a user via the output 108 to address an operating issue at a component 114 or control system associated with the notification upon exceeding the threshold number of notifications.

In some aspects, the notifications correspond to information used to construct an alarm condition of the component 114 or control system. For example, the notification may correspond to an alarm condition in a turbine or pump necessitating observation. In other aspects, the notifications may correspond to information used to construct an abnormal operating condition of a sensor in the component 114. As an example, the abnormal operating condition may be a sensor experiencing a dithering condition in which the sensed value is fluctuating near an alarm triggering value.

Figure 2:
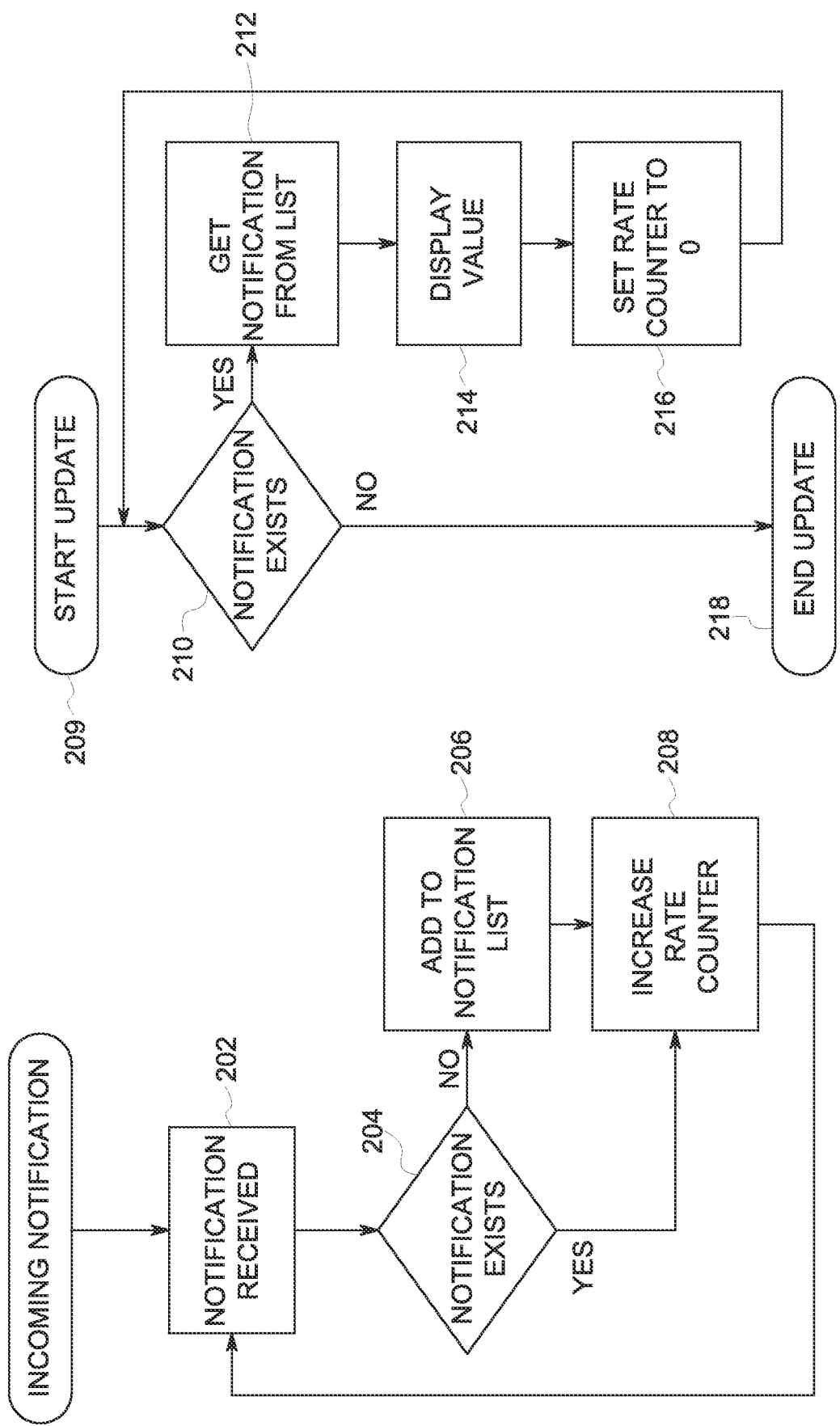
FIG. 2 comprises an operational flow chart illustrating an approach for receiving an incoming notification used for high notification rate detection according to various embodiments of the present invention.

Referring now to FIG. 2, one example of an approach 200 for receiving an incoming notification used for high notification rate detection is described. First, at step 202, a notification is received Next, at step 204, the approach 200 determines whether a notification exists. If a notification does not exist, the approach 200 proceeds to step 206, where the notification is added to the list and proceeds to step 208.

If a notification does exist, the approach 200 also proceeds to 208 where the rate counter representative of a number of received notifications increases the count by a unit. This approach 200 repeats when any notifications are received.

Figure 3:
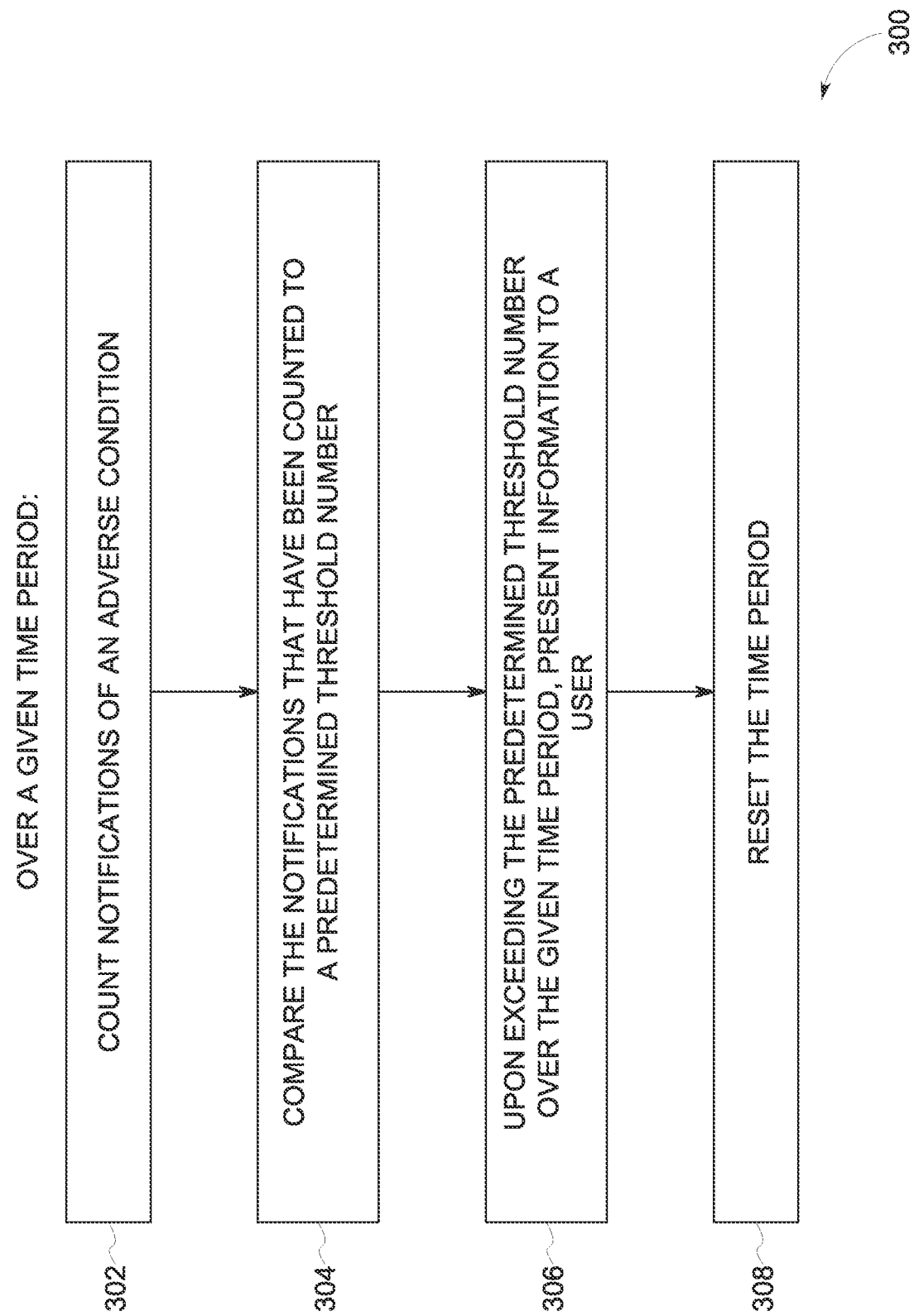
FIG. 3 comprises an operational flow chart illustrating an approach for updating a presentation tool used for high notification rate detection according to various embodiments of the present invention.

Referring to FIG. 3, one example of an approach 300 for updating a presentation tool used for high notification rate detection 300 is described. Over a given time period, at step 302, notifications of an adverse condition are counted.

Next, at step 304, the counted notifications are compared to a predetermined threshold number of notifications. At step 306, information is presented to a user upon exceeding the predetermined threshold number over the given time period. The approach 300 then resets the time period at step 308.

In some of these approaches, the counted notifications include information used to construct an alarm. In others of these approaches, the step 302 of counting notifications includes detecting information used to construct an abnormal, non-alarm event.

In yet other examples, the approach 300 further includes the step of determining whether the notification exists in a database. If the notification does not exist in the database, it is added thereto. Additionally, the approach may increase a value associated with the counter by a unit.

Turning now to FIG. 4, an illustration of a presentation tool 400 used for high notification rate detection is provided. The presentation tool 400 includes a symbol portion 402, a rate portion 404, a device name portion 406, an acknowledgement portion 408, an alarm state portion 410, and a variable name portion 412. It will be understood that while only three rows are illustrated, the presentation tool 400 may include rows for any number of components in the system.

The symbol portion 402 may be used as a visual identifier which provides an indication to the operator of the condition of various components. Any number of symbols may be used in the symbol portion 402. The rate portion 404 provides a visual description of the current rate in which notifications are being transmitted.

The device name portion 406 may be used to provide the name of components in the system. The acknowledged portion 408 allows the user to select whether a notification has been acknowledged and/or addressed. The alarm state portion 410 provides a visual indicator for the current state of the particular device. This may include whether the device is currently indicating an alarm. The variable name portion 412 provides a visual indicator for the particular variable of a device. An individual device may have numerous variables, thus the variable name portion 412 allows the operator to visually identify which portion of the device is being presented.

In operation, upon a device indicating an alarm, portions of the presentation tool 400 begin to populate. For example, the device name portion 406 may indicate that a particular device, for example, a turbine is generating an alarm. The variable name portion 412 will indicate what portion of the turbine is generating this alarm. The alarm state portion 410 will then indicate that the alarm is currently active, for example by depicting the word "ON".

The acknowledge portion 408 will describe whether the alarm is acknowledged by the operator. In some approaches, acknowledging the alarm may cause the alarm state portion 410 to change from "ON" to "OFF".

The rate portion 404 is configured to display the numerical rate in which notifications are being transmitted from the device to the apparatus. This value may change as the frequency of receiving alarms may also fluctuate. In some approaches, the symbol portion 402 may indicate that the rate of a particular component has exceeded a threshold value. For example, as seen in the third column, when the component is receiving a notification containing an alarm at a rate of 11 times per second, the symbol portion 402 may provide a different indicator to alert the user of this high rate. In the provided illustration, this symbol portion 402 may change from a "+" sign which indicates the presence of an alarm to a "!" sign indicating the rate of receipt has exceeded the threshold value. The user may then act accordingly by addressing the component or by performing any number of subsequent tasks. Alternatively, the user may choose to do nothing to address the cause of the indicators.

It will be appreciated by those skilled in the art that modifications to the foregoing embodiments may be made in various aspects. Other variations clearly would also work, and are within the scope and spirit of the invention. The present invention is set forth with particularity in the appended claims. It is deemed that the spirit and scope of that invention encompasses such modifications and alterations to the embodiments herein as would be apparent to one of ordinary skill in the art and familiar with the teachings of the present application.

What is claimed is:

1. A method of actively detecting abnormal activity, the method comprising:
   updating a display of a presentation tool periodically at a given time period;
   over each given time period:
      counting notifications of an adverse condition;
      comparing the notifications that have been counted to a predetermined threshold number of notifications; and
      when the predetermined threshold number of notifications over the given time period is exceeded, presenting information on the display of the presentation tool indicating a rate of the notifications over the given time period to a user for the user to address an operating issue at a control system associated with the notification; and
   at the beginning of a next given time period, resetting a timer associated with the given time period.

2. The method of claim 1, wherein the notifications include information used to construct an alarm.

3. The method of claim 1, wherein the step of counting notifications comprises detecting information used to construct an abnormal, non-alarm event.

4. The method of claim 1, further comprising the step of determining whether the notification exists in a database, wherein if the notification does not exist in the database it is added thereto.

5. The method of claim 4, further comprising the step of increasing a value associated with the counter by a unit.

6. A rate detection apparatus comprising:
   an interface having an input and an output;
   a processor coupled to the interface, the processor configured to:
      update a display of a presentation tool via the output periodically at a given time period;
      over each given time period:

count notifications of an adverse condition via the input;

compare the notifications that have been counted to a predetermined threshold number of notifications; and when the predetermined threshold number of notifications over the given time period is exceeded, present information to a user via the output on the display of the presentation tool indicating a rate of the notifications over the given time period to address an operating issue at a control system associated with the notification; and at the beginning of a next given time period, reset a timer associated with the given time period.

7. The rate detection apparatus of claim 6, wherein the notifications correspond to information used to construct an alarm condition of the control system.

8. The rate detection apparatus of claim 6, wherein the notifications correspond to information used to construct an abnormal operating condition of a sensor in the control system.

9. The method of claim 1, wherein the rate of the notifications over the given time period exceeds an update rate of the display of the presentation tool.

10. The method of claim 1, wherein the rate of the notifications over the given time period is at least 50 notifications per second.

11. The rate detection apparatus of claim 6, wherein the rate of the notifications over the given time period exceeds an update rate of the display of the presentation tool.

12. The rate detection apparatus of claim 6, wherein the rate of the notifications over the given time period is at least 50 notifications per second.

* * * * *